US009583084B1

(12) United States Patent
Fagan

(10) Patent No.: US 9,583,084 B1
(45) Date of Patent: Feb. 28, 2017

(54) SYSTEM FOR ADAPTIVE DEMARCATION OF SELECTIVELY ACQUIRED TONAL SCALE ON NOTE ACTUATORS OF MUSICAL INSTRUMENT

(71) Applicant: Matthew Eric Fagan, Columbia, MD (US)

(72) Inventor: Matthew Eric Fagan, Columbia, MD (US)

( * ) Notice: Subject to any disclaimer, the term of this patent is extended or adjusted under 35 U.S.C. 154(b) by 0 days.

(21) Appl. No.: 14/751,565

(22) Filed: Jun. 26, 2015

Related U.S. Application Data

(60) Provisional application No. 62/017,374, filed on Jun. 26, 2014.

(51) Int. Cl.
*G09B 15/08* (2006.01)
*G04B 13/00* (2006.01)
*G10G 1/02* (2006.01)

(52) U.S. Cl.
CPC ......... *G10G 1/02* (2013.01); *G10H 2210/525* (2013.01); *G10H 2220/036* (2013.01); *G10H 2220/066* (2013.01)

(58) Field of Classification Search
USPC ........................................................ 84/464 A
See application file for complete search history.

(56) References Cited

U.S. PATENT DOCUMENTS 4,040,324 A 8/1977 Green
4,314,499 A * 2/1982 Olsen ..................... G09B 15/08 434/227
4,428,269 A 1/1984 Bione et al.
4,480,521 A * 11/1984 Schmoyer .............. G09B 15/08 84/115
5,440,071 A 8/1995 Johnson
5,841,053 A * 11/1998 Johnson ................... G10C 3/12 84/423 R
6,080,925 A 6/2000 Rogers et al.
6,348,649 B1 * 2/2002 Chen ...................... G09B 15/02 84/464 A
7,671,265 B2 3/2010 Herrick
8,008,563 B1 8/2011 Hastings
8,779,268 B2 7/2014 Serletic et al.
8,901,405 B1 12/2014 McCarthy
(Continued)

*Primary Examiner* — Christopher Uhlir
(74) *Attorney, Agent, or Firm* — Rosenberg, Klein & Lee

(57) ABSTRACT

A system is provided for adaptive demarcation of a selectively defined tonal scale on a musical instrument having a set of note actuators which span at least one musical octave. A scale acquisition portion acquires a tonal scale characterized at least by a predetermined mode and predetermined key signature, to define a predefined ordered series of tone components. The tone components are represented by different musical notes, and are successively separated in pitch by tonal intervals. A scale delineation portion coupled to the scale acquisition portion adaptively maps the tone components to a corresponding subset of the note actuators within at least one musical octave. A plurality of marker portions coupled respectively to the note actuators are selectively enabled according to the tone components' mapping to visually indicate the subset of note actuators corresponding thereto. Visual indication is thereby adaptively maintained for the note actuators of the acquired tonal scale.

20 Claims, 11 Drawing Sheets

(56) References Cited

U.S. PATENT DOCUMENTS

| | | | | |
|---|---|---|---|---|
| 8,907,195 | B1 * | 12/2014 | Erol | G09B 5/06<br>84/609 |
| 2006/0249008 | A1 | 11/2006 | Luther | |
| 2013/0068086 | A1 | 3/2013 | Mittelstadt et al. | |
| 2014/0137721 | A1 | 5/2014 | Little et al. | |

* cited by examiner

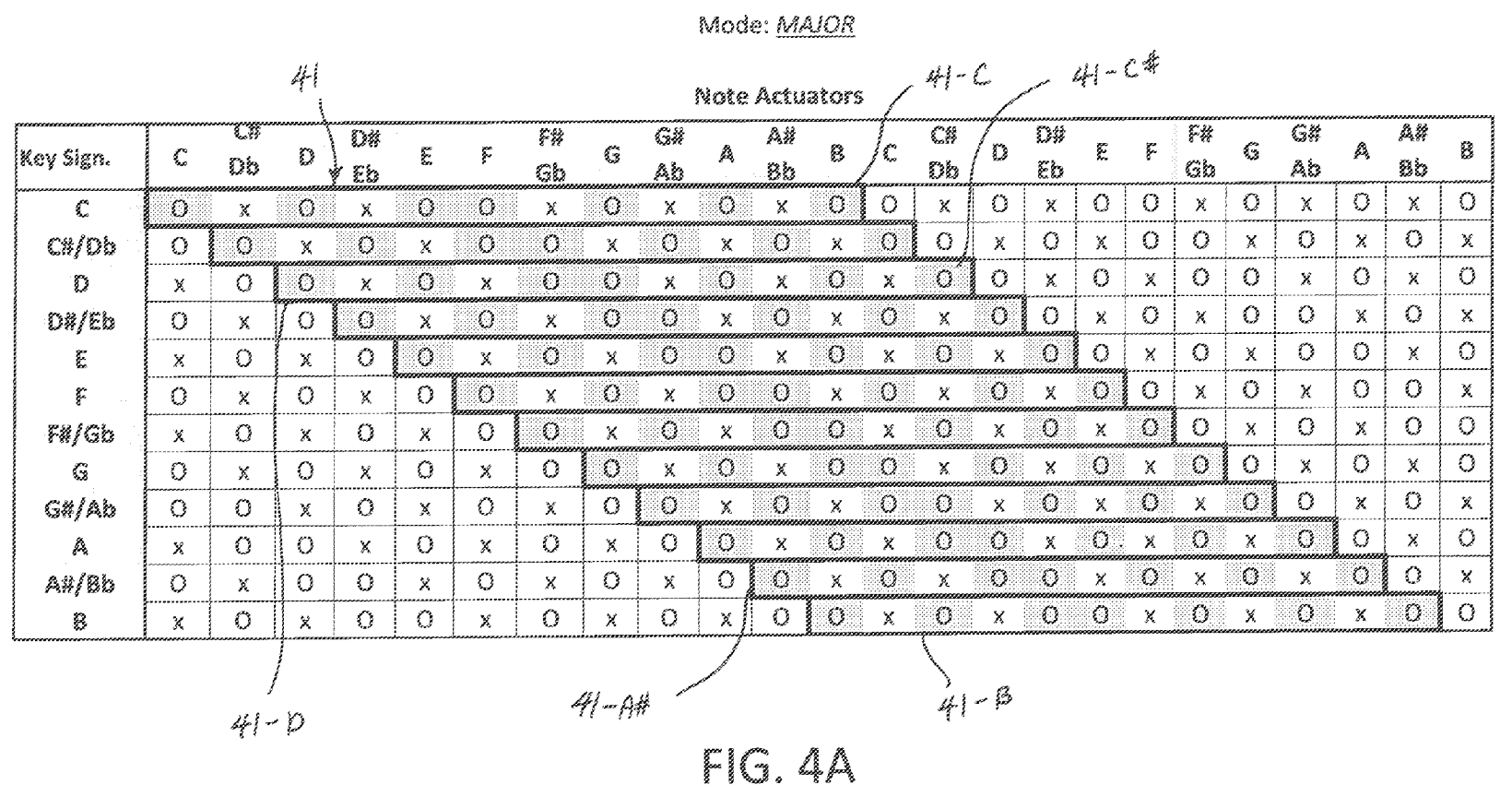

Mode: MAJOR

Note Actuators

| Key Sign. | C | C# Db | D | D# Eb | E | F | F# Gb | G | G# Ab | A | A# Bb | B | C | C# Db | D | D# Eb | E | F | F# Gb | G | G# Ab | A | A# Bb | B |
|---|---|---|---|---|---|---|---|---|---|---|---|---|---|---|---|---|---|---|---|---|---|---|---|---|
| C | O | x | O | x | O | O | x | O | x | O | x | O | O | x | O | x | O | O | x | O | x | O | x | O |
| C#/Db | O | O | x | O | x | O | O | x | O | x | O | x | O | O | x | O | x | O | O | x | O | x | O | x |
| D | x | O | O | x | O | x | O | O | x | O | x | O | x | O | O | x | O | x | O | O | x | O | x | O |
| D#/Eb | O | x | O | O | x | O | x | O | O | x | O | x | O | x | O | O | x | O | x | O | O | x | O | x |
| E | x | O | x | O | O | x | O | x | O | O | x | O | x | O | x | O | O | x | O | x | O | O | x | O |
| F | O | x | O | x | O | O | x | O | x | O | O | x | O | x | O | x | O | O | x | O | x | O | O | x |
| F#/Gb | x | O | x | O | x | O | O | x | O | x | O | O | x | O | x | O | x | O | O | x | O | x | O | O |
| G | O | x | O | x | O | x | O | O | x | O | x | O | O | x | O | x | O | x | O | O | x | O | x | O |
| G#/Ab | O | O | x | O | x | O | x | O | O | x | O | x | O | O | x | O | x | O | x | O | O | x | O | x |
| A | x | O | O | x | O | x | O | x | O | O | x | O | x | O | O | x | O | x | O | x | O | O | x | O |
| A#/Bb | O | x | O | O | x | O | x | O | x | O | O | x | O | x | O | O | x | O | x | O | x | O | O | x |
| B | x | O | x | O | O | x | O | x | O | x | O | O | x | O | x | O | O | x | O | x | O | x | O | O |

FIG. 4A

Mode: <u>MINOR</u>

Note Actuators

| Key Sign. | C | C# Db | D | D# Eb | E | F | F# Gb | G | G# Ab | A | A# Bb | B | C | C# Db | D | D# Eb | E | F | F# Gb | G | G# Ab | A | A# Bb | B |
|---|---|---|---|---|---|---|---|---|---|---|---|---|---|---|---|---|---|---|---|---|---|---|---|---|
| C | O | x | O | O | x | O | x | O | O | x | O | x | O | x | O | O | x | O | x | O | O | x | O | x |
| C#/Db | x | O | x | O | O | x | O | x | O | O | x | O | x | O | x | O | O | x | O | x | O | O | x | O |
| D | O | x | O | x | O | O | x | O | x | O | O | x | O | x | O | x | O | O | x | O | x | O | O | x |
| D#/Eb | x | O | x | O | x | O | O | x | O | x | O | O | x | O | x | O | x | O | O | x | O | x | O | O |
| E | O | x | O | x | O | x | O | O | x | O | x | O | O | x | O | x | O | x | O | O | x | O | x | O |
| F | O | O | x | O | x | O | x | O | O | x | O | x | O | O | x | O | x | O | x | O | O | x | O | x |
| F#/Gb | x | O | O | x | O | x | O | x | O | O | x | O | x | O | O | x | O | x | O | x | O | O | x | O |
| G | O | x | O | O | x | O | x | O | x | O | O | x | O | x | O | O | x | O | x | O | x | O | O | x |
| G#/Ab | x | O | x | O | O | x | O | x | O | x | O | O | x | O | x | O | O | x | O | x | O | x | O | O |
| A | O | x | O | x | O | O | x | O | x | O | x | O | O | x | O | x | O | O | x | O | x | O | x | O |
| A#/Bb | O | O | x | O | x | O | O | x | O | x | O | x | O | O | x | O | x | O | O | x | O | x | O | x |
| B | x | O | O | x | O | x | O | O | x | O | x | O | x | O | O | x | O | x | O | O | x | O | x | O |

43 43-C 43-C# 43-D 43-A# 43-B

FIG. 4B

SYSTEM FOR ADAPTIVE DEMARCATION OF SELECTIVELY ACQUIRED TONAL SCALE ON NOTE ACTUATORS OF MUSICAL INSTRUMENT

RELATED APPLICATION DATA

This Application is based on Provisional Patent Application No. 62/017,374, filed 26 Jun. 2014.

BACKGROUND OF THE INVENTION

The present invention is generally directed to a system for adaptive visual demarcation of note actuators provided on a musical instrument for producing musical notes, according to a selectively acquired tonal scale. More specifically, the present invention is directed to such system which automatically tracks and indicates for the user those note actuators of the instrument which correspond to musical notes within the ordered series of tone components forming the acquired tonal scale.

Musical pieces are composed and played in a wide variety of tonal scales known in the art. Undoubtedly, other tonal scales are still being developed in the art by creative individuals, and will continue to be. Each distinct tonal scale is generally defined according to two characteristic parameters, namely a key signature and mode. The key signature identifies one of the 12 notes consecutively stepped in pitch within one musical octave, as conventionally provided on a piano-type keyboard (the $13^{th}$ note being the next occurrence of the first note offset in pitch by one 'octave' therefrom). Adjacent keys—whether white or black on a typical piano-type keyboard—are actually 'stepped' by a half (½) step interval in pitch. Consecutive white keys that are interrupted by an intervening shorter black key disposed therebetween are separated by a whole step interval from one another, while each is separated by a half step interval from the intervening black key. On the other hand, successive black keys are separated from one another either by one or two white keys. In the first case, the successive black keys are disposed two half step intervals (or one whole step interval) apart, and in the second case they are disposed three half step intervals apart.

The use of tonal scales reflects the fact that certain combinations of musical tones are consonant, or mutually complementary and acoustically pleasing, and certain other combinations of tones are dissonant, or mutually discordant and acoustically displeasing. So, except for certain minor transitional stages or for other stray instances, the notes and chords used in music pieces tend to remain within the applicable scales.

Modes denote a relative ordering of certain modal number of notes taken from the 12 notes available in a conventional octave. In many recognized modes, like the widely-used Major (or Ionian) mode, an ordered series of seven constituent notes are used within each octave. The mode is defined in relative terms by the tonal intervals successively separating the constituent notes (or more precisely, the constituent note slots/positions which are filled upon key signature assignment). In the case of the Major mode, counting the first tonal interval as following the first constituent note position, the constituent note positions are separate by a whole step everywhere except at the third and seventh intervals (or between the third and fourth constituent notes, and between the seventh constituent note and the first constituent note of the next octave)—where the notes are separated by a half step. The actual note values for the constituent notes are established only after a key signature is assigned to the mode to fully define the resultant tonal scale.

Thus, a C-Major scale—having a Major mode assigned with a key signature of C—includes as its constituent notes, or component tones, the notes C-D-E-F-G-A-B which correspond notably to seven consecutive white keys on a piano-type keyboard. When assigned a different key signature, of course, the component tones of the resulting Major scale would correspond to a different series of notes. For example, a D-Major scale is formed by the notes D-E-F#-G-A-B-C# (expressed alternatively as D-E-Gb-G-A-B-Db, since the black keys may each be alternatively identified as sharp # or flat b notes).

By way of another example, the well-known Minor (or Aeolian) mode is also formed by seven constituent notes, but with two half steps located at the second and fifth tone intervals. So a C-Minor scale—having a Minor mode assigned with a key signature of C—includes as its component tones the notes C-D-D#-F-G-G#-A#(or alternatively expressed as C-D-Eb-F-G-Ab-Bb), whereas a D-Minor scale includes as its component tones the notes D-E-F-G-A-A#-C (or alternative expressed as D-E-F-G-A-Bb-C).

Numerous other modes are known, each of which designates its own predefined number of notes taken from a conventional octave, and orders them in a series successively separated according to a certain defining pattern. A distinct musical scale (or tonal scale) is established by referencing each mode to a different key signature, much as described in preceding paragraphs.

The mental juxtaposition required to keep up with even a few mode-key signature combinations, then to accurately align and mentally track, an imaginary tonal component template through the successive octaves of keys provided on a conventional keyboard, for instance, poses significant challenges to would-be musicians and seasoned musicians alike. Confusion as to which of the instrument's keys/note actuators are included in the scale applicable at that time invariably leads to error in playing the proper notes and chords of the scale. It also leads to needless delay and distraction as they struggle to remain mindful of the proper keys.

There is therefore a need for measures to simplify the process of ascertaining the particular keys, strings, or other note actuators of a musical instrument pertaining to an applicable tonal scale. There is a need for such measures which enable users to quickly and conveniently identify the note actuators pertinent to the applicable scale, and provide a visual guide for proper actuation of notes and chords within that applicable scale. There is a need for such measures for selective acquisition of the applicable tonal scale and adaptive visual demarcation of the same on a given instrument's note actuators.

SUMMARY OF THE INVENTION

It is an object of the present invention to provide a system having measures to simplify the process of ascertaining the particular keys, strings, or other note actuators of a musical instrument pertaining to an applicable tonal scale.

It is another object of the present invention to provide a system which enables users to quickly and conveniently identify musical instruments' note actuators pertinent to an applicable tonal scale, and provide a visual guide for proper actuation of notes and chords within that scale.

It is yet another object of the present invention to provide a system which enables adaptive visual demarcation of a selectively acquired tonal scale on a given instrument's note actuators.

These and other objects are attained in a system for adaptive demarcation of a selectively defined tonal scale on a musical instrument having a set of note actuators. The note actuators are each independently excitable to actuate a musical note corresponding thereto, and respectively actuate musical notes collectively spanning at least one musical octave. A scale acquisition portion acquires a tonal scale characterized at least by a predetermined mode and predetermined key signature, wherein the predetermined key signature identifies one of the musical notes as a root tone component, and the predetermined mode denotes a predefined ordered series of tone components beginning with the root tone component. The tone components are respectively represented by different musical notes within one musical octave of the root component, and are successively separated in pitch by tonal intervals. A scale delineation portion is coupled to the scale acquisition portion, and operates to adaptively map the tone components of the acquired tonal scale to a corresponding subset of the note actuators within at least one musical octave. A plurality of marker portions are coupled respectively to the note actuators, which marker portions are selectively enabled according to the mapping of tone components, so as to visually indicate the subset of note actuators corresponding thereto. Visual indication is thereby adaptively maintained for the note actuators pertaining to the acquired tonal scale.

A system formed in accordance with certain exemplary embodiments of the present invention for adaptive indication of note actuators for a musical instrument according to a selectively defined scale comprises a set of note actuators, where each note actuator is independently excitable to actuate a musical note corresponding thereto. The note actuators respectively actuate musical notes collectively spanning a plurality of musical octaves. A scale acquisition portion acquires a tonal scale characterized at least by a predetermined mode and predetermined key signature, with the predetermined key signature identifying one of the musical notes as a root tone component, and the predetermined mode denoting a predefined ordered series of tone components beginning with the root tone component. The tone components are respectively represented by different musical notes within one musical octave of the root component, and are successively separated in pitch by tonal intervals. A scale delineation portion coupled to the scale acquisition portion operates to adaptively map the tone components of the acquired tonal scale to a corresponding subset of the note actuators within at least one musical octave. A plurality of marker portions are coupled respectively to the note actuators, and are adaptively enabled responsive to acquisition of the tonal scale, so as to visually indicate the subset of note actuators corresponding thereto. The marker portions include at least one lighting element for independently illuminating each of the note actuators. A controller coupled to the scale delineation and marker portions executes to automatically actuate a preselected set of the marker portions responsive to the mapping of tone components for at least one musical octave represented by the note actuators. Visual indication is thereby adaptively maintained for the note actuators pertaining to the tone components of the acquired tonal scale.

A keyboard controlled musical instrument system is formed in accordance with certain other exemplary embodiments of the present invention having adaptive demarcation of a selectively defined tonal scale thereon. The system comprises a set of keys, each key being independently excitable to actuate a musical note corresponding thereto, and the set of keys respectively actuating musical notes collectively spanning at least one musical octave. A scale acquisition portion serves to acquire a tonal scale characterized at least by a predetermined mode and predetermined key signature, where the predetermined key signature identifies one of the musical notes as a root tone component, and the predetermined mode denotes a predefined ordered series of tone components beginning with the root tone component. The tone components are respectively represented by different musical notes within one musical octave of the root component, and are successively separated in pitch by tonal intervals. A scale delineation portion is coupled to the scale acquisition portion, which scale delineation portion adaptively maps the tone components of the acquired tonal scale to a corresponding subset of the keys within at least one musical octave. A plurality of marker portions are coupled respectively to the keys, which marker portions are adaptively enabled responsive to the mapping of tone components to visually indicate the subset of the keys corresponding thereto. A controller coupled to the scale delineation and marker portions executes to automatically actuate a preselected set of said marker portions responsive to the mapping of tone components for at least one musical octave represented by the keys. Visual indication is thereby adaptively maintained for the keys available for the tone components of the selectively defined tonal scale.

BRIEF DESCRIPTION OF THE DRAWINGS

FIG. 4A is sample look up table schematically illustrating a mapping between certain note actuators and the tone components of a certain tonal scale, such as employed by the embodiment of FIG. 1;

FIG. 4B is another sample look up table schematically illustrating a mapping between certain note actuators and the tone components of a certain other tonal scale, such as employed by the embodiment of FIG. 1;

DETAILED DESCRIPTION OF THE PREFERRED EMBODIMENTS

Figure 1:
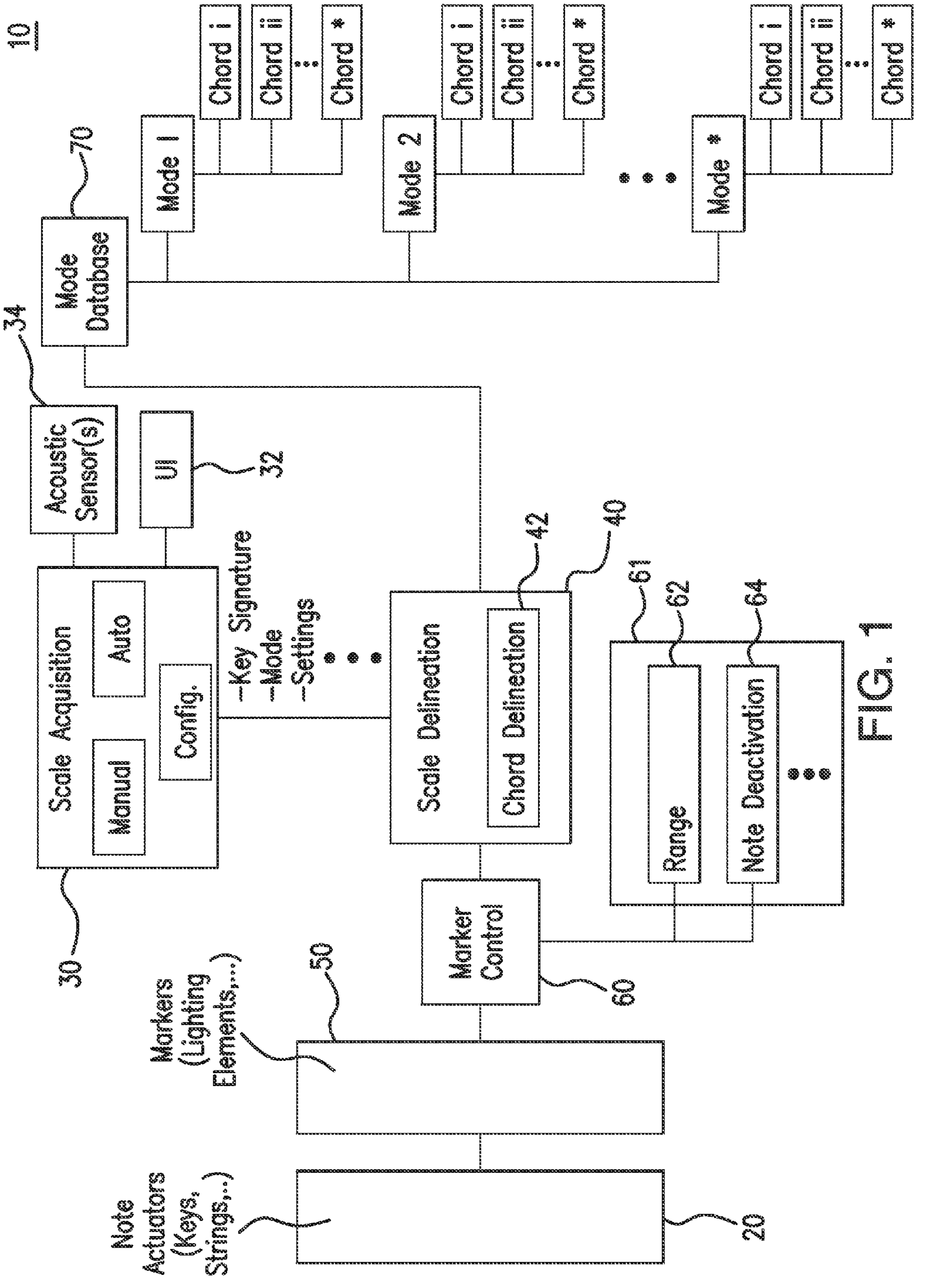
FIG. 1 a block diagram schematically illustrating the intercoupling of functional portions and units in one exemplary embodiment of the present invention.

Generally, a system formed in accordance with certain exemplary embodiments of the present invention serves to adaptively demarcate select portions of those keys, strings, buttons, or other such note actuators on various musical instruments 'played' by a user to control the musical notes generated thereby. The system adapts to a particular tonal scale (selectively defined by a particular key signature and mode) by automatically marking in a visually conspicuous manner those note actuators of the instrument which actuate the musical notes forming the predefined ordered series of tone components constituent to the scale. The system thus enables the user to conveniently and quickly recognize the note actuators within one or more musical octave which are available to be played while remaining within the particularly selected scale.

Individuals who play musical instruments have normally attained at least a basic level of proficiency to recognize which note actuators to excite (or 'play'), and in what combinations, to audibly produce various musical tones. In various contexts and applications, however, a basic knowledge of what note actuators to depress, strum, manipulate, or otherwise excite to produce different musical notes is not enough. For example, where a user is seeking to effectively compose an original musical piece, or to arrange or adapt to an existing musical piece, the user must identify the particular tonal scale applicable to that piece, so as to determine which musical notes are included in the ordered series of tone components forming the identified scale. Even after the applicable scale is identified, the user must be able to quickly recognize which of the note actuators presently at his/her disposal on the given musical instrument actually correspond to the scale's tone components.

This requires considerable mental focus and cognitive exertion, not to mention extensive knowledge and abundant memory. As described in following paragraphs, the numerous known modes are formed by differently combined sequential orderings of notes within a musical octave. Even within the same mode, different key signatures will shift the actual notes ultimately making up a particular tonal scale. Consequently, it is an enormous challenge even for very experienced musicians to dynamically keep track as to which of the instrument's keys, strings, or other note actuators are properly available at any given time for play within the applicable scale.

A system formed in accordance with certain exemplary embodiments of the present invention relieves users of such burdensome challenges. It serves to selectively mark in visually conspicuous manner to highlight the note actuators which pertain to the applicable tonal scale. In a keyboard-controlled instrument such as a piano, organ, or synthesized keyboard, for instance, the system operates to acquire the applicable tonal scale; map the acquired scale's tone components to the corresponding keys of the keyboard; then visually indicate within one or more musical octaves only those keys actually belonging to the acquired scale. This frees the seasoned musician to channel all his/her focus and energy into the music—be it to play, compose, or improvise upon a musical piece. It also aids the beginner and novice musician, helping them to visually learn the full capabilities of their musical instrument in light of various tonal scales.

The visual indication is preferably realized in certain embodiments and applications at least by illuminating the relevant keys in one or more colors, but other suitable measures known in the art may be employed to visually highlight the relevant keys depending on the requirements of the particularly intended application. Also depending on the requirements of the particularly intended application, the applicable tonal scale may be acquired manually by user selected input (through a suitable user interface), or automatically by suitable audio processing of a music sample captured via acoustic sensing measures, recording playback measures, or the like.

In certain other exemplary embodiments, the system upon acquisition of the tonal scale determines the various chords available within that scale. Where suitably prompted by user input, the system secondarily illuminates (or otherwise suitably indicates) those keys within the acquired scale available for combined activation to play one or more identified chords. Depending on the particular requirements of the intended application, this secondary illumination may be supplemental to or in place of the primary illumination of the acquired scale's keys.

In still other exemplary embodiments, the system may be employed for a musical instrument having note actuators that span multiple octaves. A standard piano, for example, provides a keyboard whose 88 keys span 7 consecutive octaves plus a minor third. Preferably though not necessarily, the system to selectively configurable by executing a range setting option to visually mark the applicable tonal scale on the pertinent note actuators over all or some of the provided octaves. Similarly, the system is preferably though not necessarily configurable in certain embodiments to selectively disable/deactivate those note actuators which do not pertain to the applicable scale. This selective deactivation may be within one or more selected octaves.

Referring now to FIG. 1, there is shown a block diagram schematically illustrating the intercoupling of functional portions and units in a system 10 formed in accordance with one exemplary embodiment of the present invention. The various portions and units of system 10 may be implemented in any suitable software and/or hardware form known in the art, or as a combination thereof. As illustrated, system 10 operates to adaptively indicate those note actuators 20 of a musical instrument corresponding to the musical notes included in an applicable tonal scale. The number and particular form of the note actuators 20 will depend on the nature of the musical instrument at hand. They may be formed, for example as the set of keys in an instrument equipped with a piano-style keyboard, such as a piano, an electronic keyboard, a synthesizer and, a USB/MIDI keyboard controller. The note actuators 20 may take various other forms, such as the strings of a guitar or other string-controlled instrument. Depending on the type of instrument, they may also be physically implemented or virtually implemented in electronically represented form. System 10 may be implemented, and even integrated, with any suitable form of note actuators 20 used in the given instrument to produce different combinations of notes individually or in chords in a particular tonal scale.

System 10 also includes a scale acquisition portion 30 which effects either manual or automatic acquisition of the particular tonal scale. As shown, the scale acquisition portion 30 is preferably equipped with a suitable user interface 32 and one or more acoustic sensors 34. The scale acquisition portion 30 operates to obtain the characteristic parameters that define the particular tonal scale, namely its key signature and mode, and provides the same to a scale delineation portion 40 In a manual acquisition configuration, the scale acquisition portion 30 reads these parameters provided by selective user entry through the user interface 32, which may include adjustable dials, toggle switches, keyboard, pointing devices, graphic user interface, or the like. In an automatic acquisition configuration, the scale acquisition portion 30 automatically computes the scale-defining parameters from a sample of music captured by the acoustic sensor(s) 34. Any suitable audio processing tool known in the art may be executed toward that end in one or more suitably programmed computer processors.

Preferably, system 10 also receives one or more other system configuration parameter settings through the user interface 32. Depending on the implementation and application, the settings may be for such parameters as: a mode capture parameter for selecting the automatic acquisition configuration of the scale acquisition portion 30 itself; a chord indication parameter for selectively enabling a chord indication unit (described in following paragraphs); a range setting parameter for selectively disabling the visual indication function for note actuators 20 disposed outside a selectively defined range of octaves; and, a note deactivation parameter for selectively disabling those note actuators 20 excluded from the acquired tonal scale.

System 10 further includes a scale delineation portion 40 which operates according to the parameter values provided by the scale acquisition portion 30 to adaptively map the tone components of the acquired tonal scale to a corresponding subset of the note actuators 20, preferably within each of the musical octaves spanned by the full set of note actuators. The scale delineation portion 40 preferably accesses a mode database 70 storing data sufficient to uniquely define a plurality of predetermined musical modes. The stored data may be supplemented periodically to maintain and build a comprehensive storehouse of mode definitions. As illustrated, data defining the distinct musical chords that may be produced by combining the available tone components is preferably also stored for each mode.

The scale delineation portion 40 serves generally to map the prevailing tone components of the acquired tonal scale to corresponding ones of the note actuators 20. That is, the scale delineation portion 40 finds the subset of note actuators in each of the octaves they span, which properly correspond to the tone components making up the then-applicable tonal scale. A plurality of marker portions 50 operably coupled to the note actuators are then enabled accordingly to visually indicate the corresponding subset of note actuators 20 to which the prevailing tone components are mapped. The system preferably employs a controller 60 programmably implemented on one or more microprocessors to coordinate visual marking of the proper note actuators 20 in one or more octaves this way.

The marker portions 50 may employ any suitable medium known in the art to selectively indicate the applicable scale's constituent note actuators 20. Preferably, the marker portions 50 employ illumination to selectively illuminate only the mapped, or constituent, subset of note actuators 20. This may be in one or more colors, depending on the requirements of the particularly intended application. The marker portions 50 may be formed in the illustrated embodiment using any suitable lighting elements known in the art. The lighting elements may be applied to or integrated with the note actuators 20, or may be formed over, under, or about the note actuators 20. One or more lighting elements may be so implemented with each individual note actuator 20. Alternatively, one or more banks of lighting elements may be implemented with to form arrays of lighting elements which may be activated in addressed, or decoded, manner to cooperatively illuminate the appropriate note actuators 20.

The use of multiple lighting elements on each key, or the use of combined yet independently activated lighting sources for each key, enables multi-dimensional visual indication, or marking, of keys. Where, for instance, a chord delineation option 42 is enabled, primary illumination may be effected for each of the keys of the applicable tonal scale to mark them accordingly. A secondary illumination of only those of the constituent keys that may be used for available chords within the applicable scale may then be effected. The secondary illumination may be in addition to or in lieu of the primary illumination, depending on the requirements of the intended application and the needs of the user. Certain illustrative examples of such lighting element implementations are variously illustrated in FIGS. 2-3D.

Preferably, a controller 60 is provided for actuating the marker portions 50 according to the mapping of note actuators 20 to the tone components of the acquired tonal scale. The controller 60 also actuates the marker portions 50 according to any optional indicator functions 61 that may be selectively enabled. For example, the controller 60 may effectuate such optional functions 61 as an octave range control function 62, according to a corresponding parametric setting, to disable visual indication for note actuators 20 outside a selected octave range. Similarly, the controller 60 may effectuate among other optional functions 61 a note deactivation function 62, according to a corresponding parametric setting, to temporarily disable the note actuators 20 that do not coincide with any of the tonal components of the acquired tonal scale.

The controller 60 is preferably coupled as shown to both the scale delineation portion 40 and marker portion 50. It may be suitably implemented in one or more computer processors, and in certain embodiments integrated with programmably implemented control measures for scale delineation and/or scale acquisition, depending on the particular requirements of the intended application.

Figure 2:
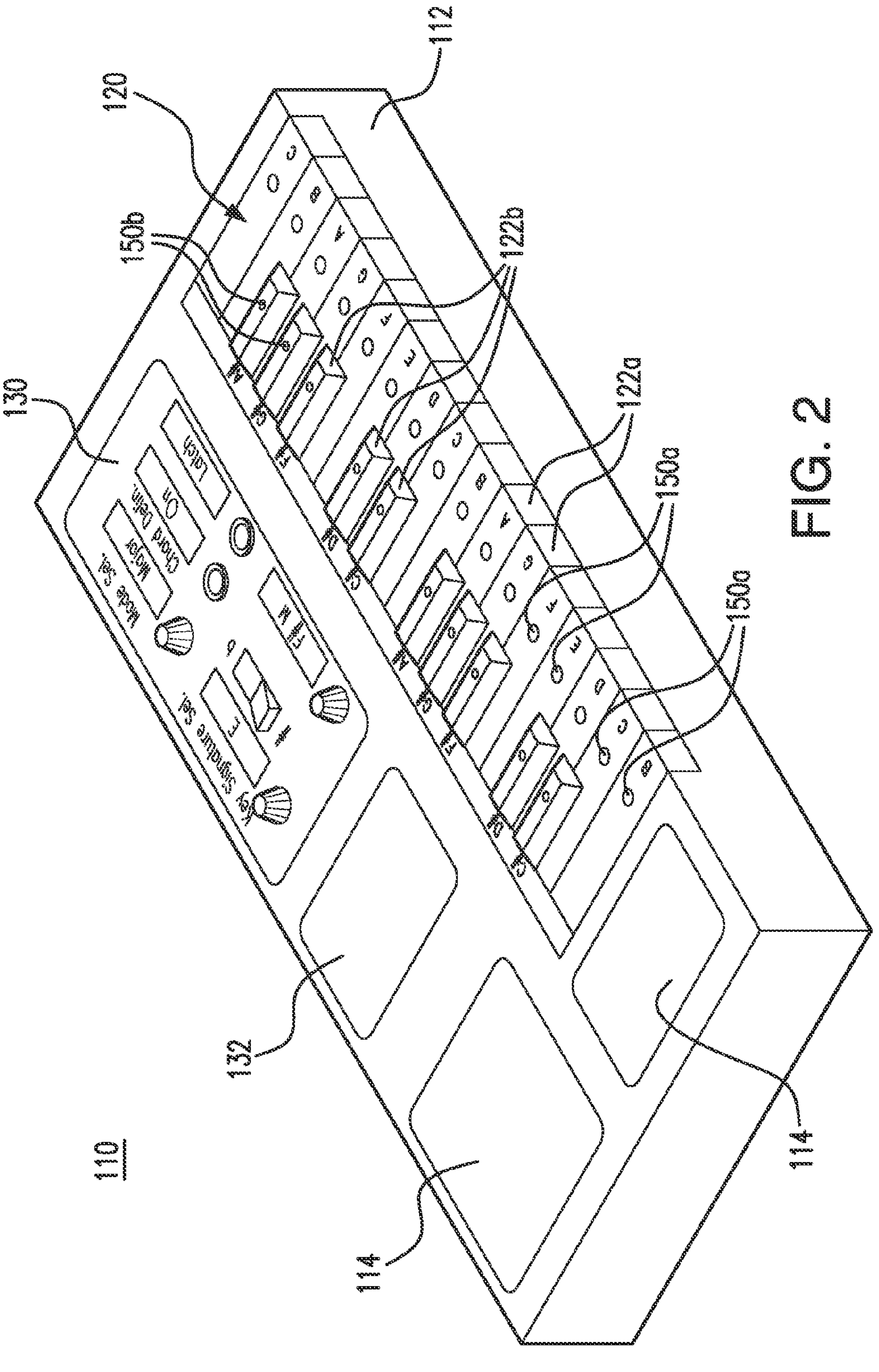
FIG. 2 is a perspective view of the embodiment of FIG. 1, as illustratively incorporated in a keyboard instrument system in accordance with one exemplary implementation thereof.

FIG. 2 illustrates an exemplary implementation of system 10 in a keyboard instrument system 110. The instrument system 110 includes a housing 112 on which a keyboard 120 is provided, along with regions 130, 132 having a suitable arrangement of various controls and interfaces by which a user may enter and ascertain scale acquisition and system configuration controls/settings. As shown in connection with the alternate system embodiment 110' illustrated in FIG. 3, these user control and interface regions 130', 132' may be combined to include, for example, rotary encoder dial/knob type, press button type, toggle switch type, and/or other suitable control/pointing measures for the user to set such parameters as the key signature and mode for scale acquisition ("E" and "Major" in the example shown). Measures 114, 114' for other parametric settings may be provided—for instance, to enable chord delineation, to configure chord delineation, to select a particular chord to highlight (chord delineation enabled, chord delineation configured to "Latch," and chord "F#m" selected in the example shown), and to even toggle the notational references for the 'black' keys 122*b* (that is, referencing them as either sharp (#) keys or flat (b) keys). Respective display windows 132' are provided showing the settings and/or selections that are made.

The user control/pointing measures of regions 130, 130' may be provided in certain alternate embodiments, as 'soft' keys or menu-driven selection within a graphical user interface generated by suitable software. Such control/pointing measures in those embodiments may be combined with the regions 132, 132' for integrated generation on a shared display screen.

While the keys are each shown labeled by note, or pitch, reference (B, C, . . . , A#), the references need not be shown in other implementations. Preferably, the note references are dynamically displayed as needed using suitable graphic display measures known in the art.

A system such as the musical instrument system 110 illustratively shown may be implemented as a combination of hardware and software. For example, one or more suitably programmed computer chips are coupled to electrical components such as rotary encoder knobs; LCD screens; switching devices, LED or other lighting devices, and the like. The lighting devices 150*a*, 150*b* are disposed on or about the musical instrument systems note actuators such as the piano keys 122*a*, 122*b* in the illustrated example. Certain switching devices in the illustrated example toggle between the "on" and "off" positions for alternative activation/deactivation of different parametrically controlled system functions. The rotary encoder knobs are used in the illustrated example to navigate through and select the various key signature and mode options, as indicated by text and character values displayed on the LCD screens shown, responsive to which a corresponding collection of the piano keys 120 are selectively illuminated. Preferably in this embodiment and configuration, upon rotation of the rotary encoder knobs, the collection of illuminated piano keys correspondingly changes in accordance with the displayed key signature-mode combination, such that the collection of illuminated piano keys remain consistent with the notes belonging to the key signature and mode (as the defined tonal scale's tone components) indicated on the LCD display.

Figure 3:
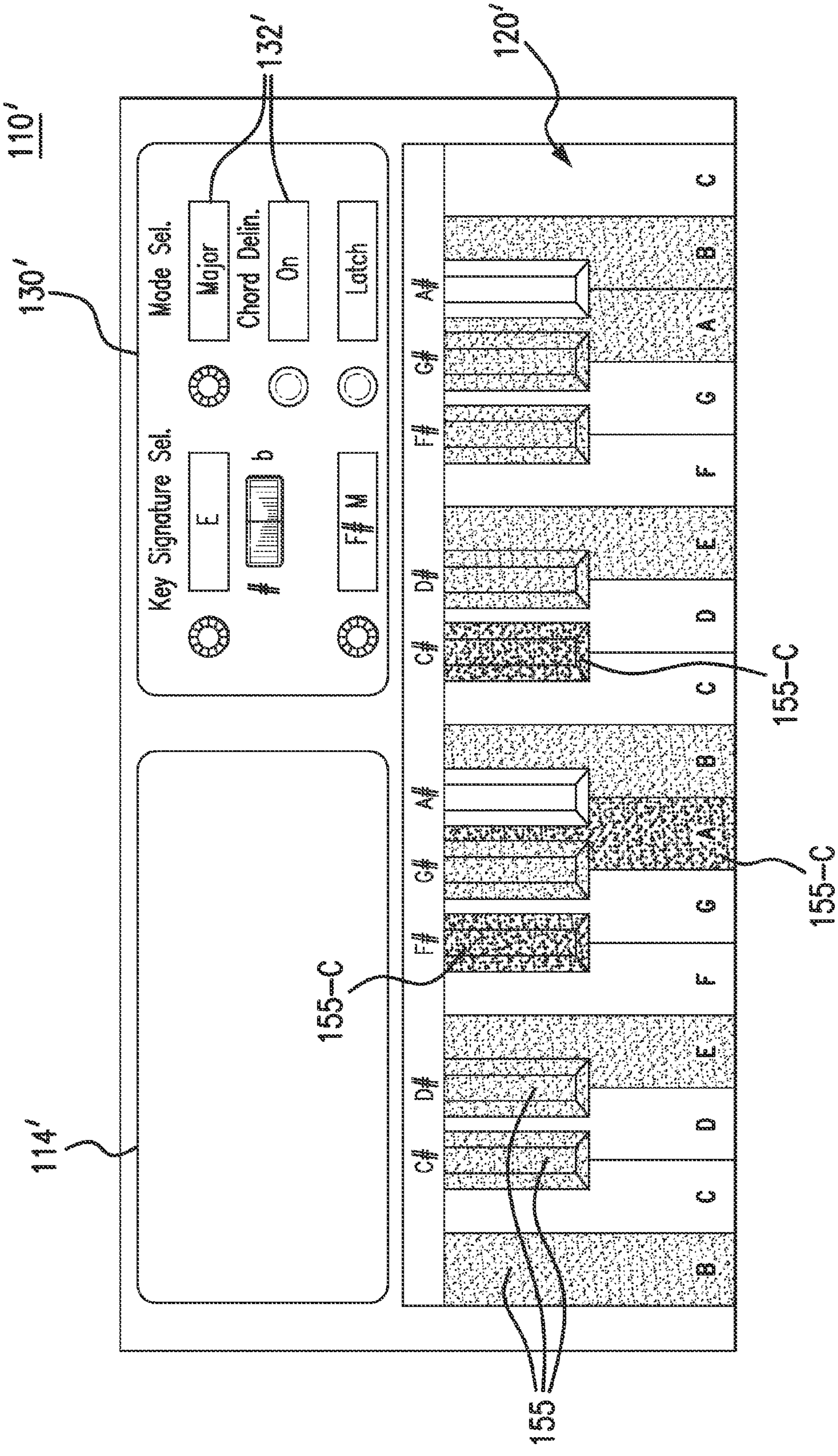
FIG. 3 is a plan view of the embodiment of FIG. 1, as illustratively incorporated in a keyboard instrument system in accordance with another exemplary implementation thereof, illustrating primary and secondary illumination of keys in one operational configuration.

In the particular embodiment of FIG. 3, the keys of the keyboard 120' are each formed of a translucent material (having some degree of transparency), and one or more lighting sources are selectively activated at or near each of the keys. Consequently, the keys belonging to the applicable scale each appear to be generally 'lit' up by the source(s). The light sources may be provided within the keys themselves, placed underneath them for backlighting, or even over or around them for overhead or peripheral illumination. Indeed, each of the keys may be peripherally 'trimmed' with selective illumination to visually highlight the appropriate keys.

Suitable lighting measures are preferably employed in this example to accommodate a chord delineating operation. The lighting is varied accordingly to adjust the brightness of the keys' illumination, so as to visually distinguish primary and secondary illuminations of the same key. As shown, the sample settings for this example call for an E-Major tonal scale, with referencing of the sharp/flat keys by the sharp notation (#), and chord delineation to be enabled and latch-configured (where only the keys for chords formed within the selected tonal scale are made available for ancillary visual marked, as opposed to making keys for all chords within a given mode or given octave available for visual marking, even if outside the selected tonal scale). The chord of interest is selected to be "F#m." The keys for B-C#-D#-E-F#-G#-A are, therefore, lit up for primarily illuminated demarcation of the tone component keys 155 in each of the 2+ octaves spanned by the keys on the given keyboard 120'. Of these E-Major tone component keys, the keys 155-*c* for the notes F#, A, C# also pertain to the selected chord F#m. So these keys 155-*c* are further lit for secondarily illuminated demarcation of the chord components in at least one of the octaves.

Figure 3A:
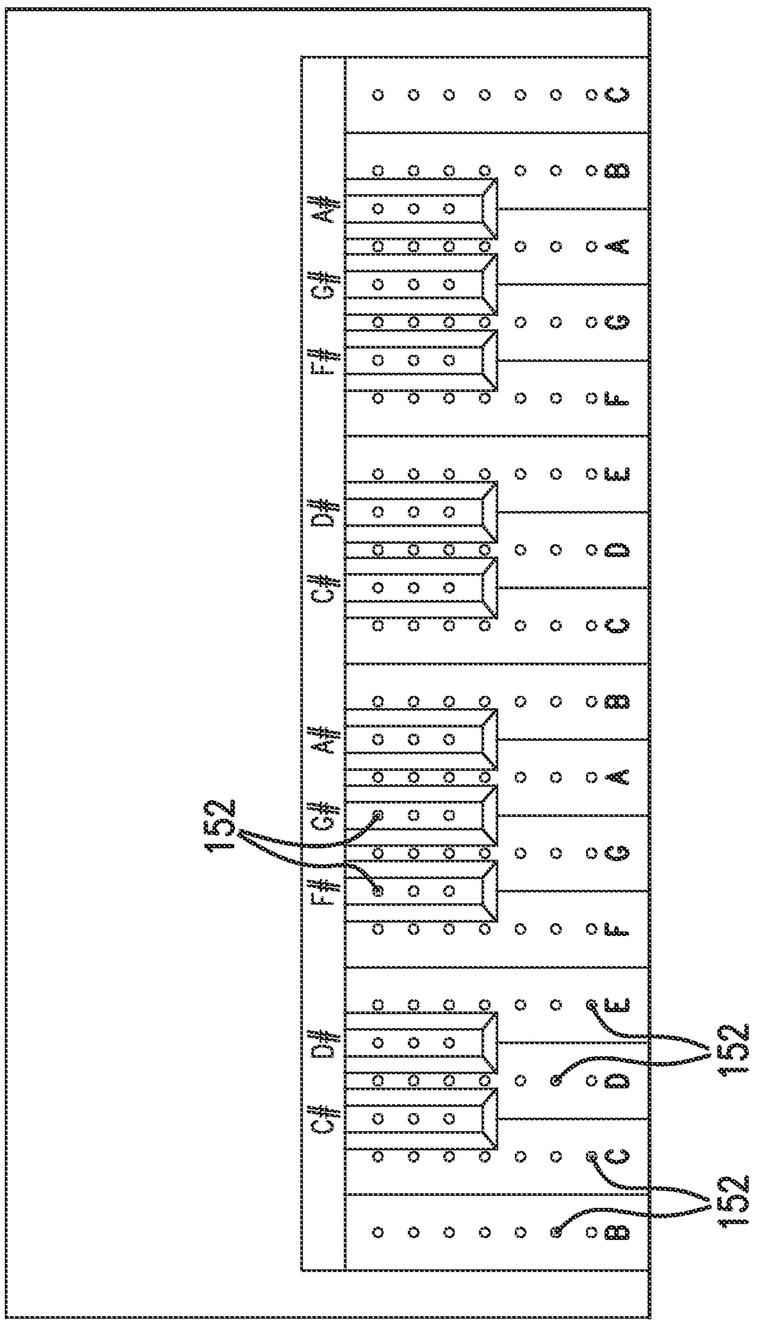
FIG. 3A is a simplified plan view, with certain details removed from view, of another exemplary embodiment similar to the embodiment shown in FIG. 3, illustrating an alternate implementation of marker portions with respect to the keys.
Figure 3B:
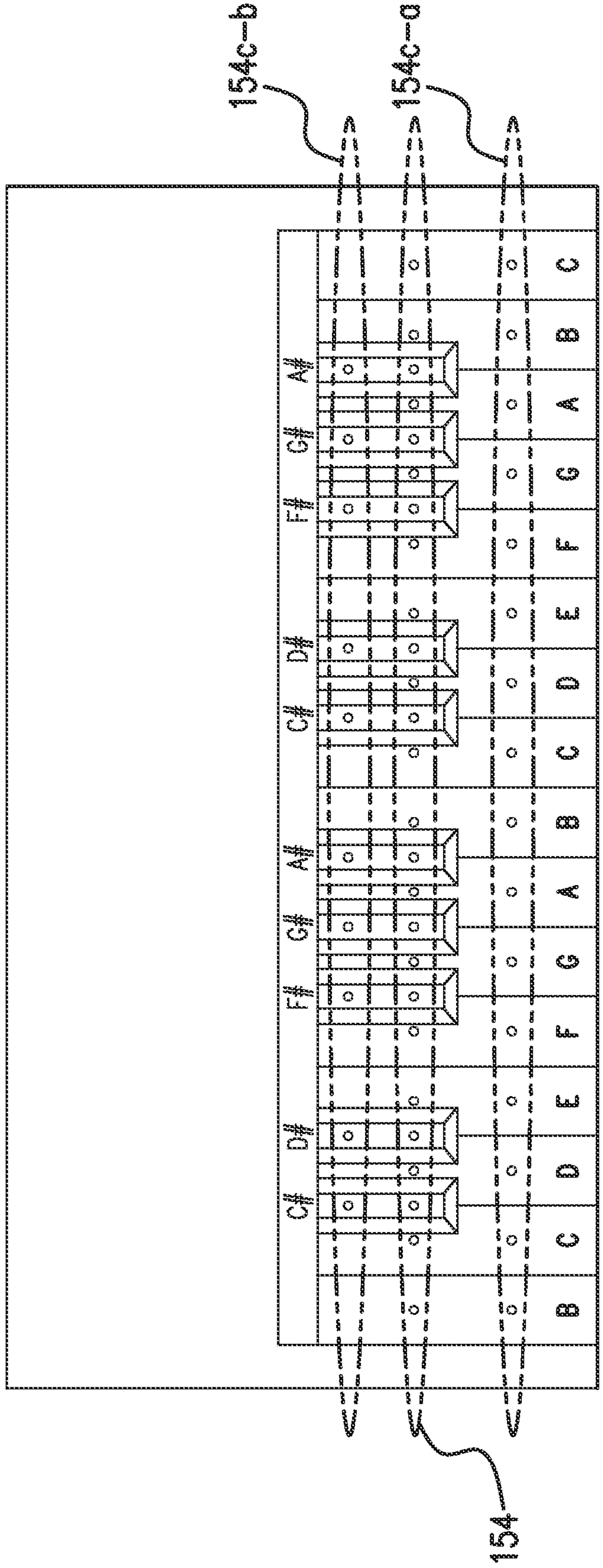
FIG. 3B is a simplified plan view, with certain details removed from view, of a further exemplary embodiment similar to the embodiment shown in FIG. 3, illustrating another alternate implementation of marker portions with respect to the keys.

FIGS. 3A-3D schematically illustrate in simplified views similar to that of FIG. 3 additional examples of the numerous approaches to implementing the marker portions 50 on a keyboard controlled musical instrument. FIGS. 3A-3B illustrate examples where at least one discrete lighting element, such as an LED device, is incorporated on/in each of the note actuating keys. In FIG. 3A, a plurality of discrete lighting elements 152, such as a row of LED devices, is disposed on each of the keys. The lighting elements 152 of each key may be illuminated together, or in different combinations, depending on the nature and level of visual demarcation needed. In FIG. 3B, a lighting element is disposed on each of the keys 154, such that an intermediate band of lighting elements is formed over the keys for one level/degree of selective key demarcation (primary illumination, for instance), while a second lighting element is disposed more peripherally on each of the keys, to form distinct peripheral bands of lighting elements 154*c*-*a*, 154*c*-*b* which enable another level/degree of selective key demarcation (secondary illumination, for instance).

Figure 3C:
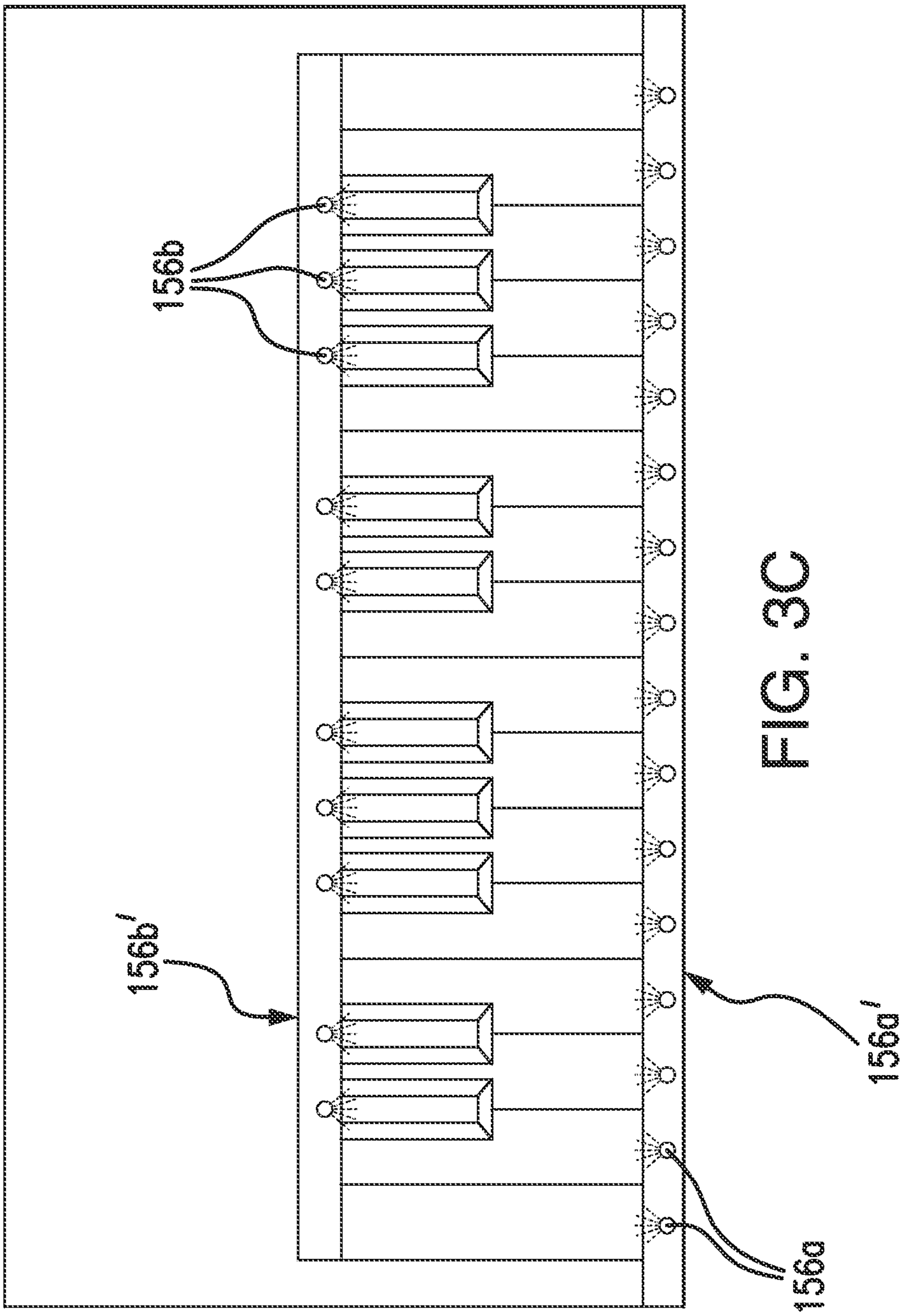
FIG. 3C is a simplified plan view, with certain details removed from view, of yet another exemplary embodiment similar to the embodiment shown in FIG. 3, illustrating a further alternate implementation of marker portions with respect to the keys.

FIG. 3C illustrates an exemplary embodiment where discrete lighting elements are disposed off-board, with respect to the keys. As shown, a first bank 156*a*' of lighting elements 156*a* is disposed on a surrounding structure along the terminal ends of the 'white' keys, while a second bank 156*b*' of lighting elements 156*b* is disposed on a surrounding structure along the inner ends of the 'black' keys. The individual lighting elements 156*a*, 156*b* are selectively activated to visually mark the keys pertinent to the acquired scale for primary illumination. The same lighting elements 156*a*, 156*b* may be activated with varying intensity or color for one or more additional levels of visual demarcation. In this regard, the keys coincident with select chords available for the acquired scale, or the root note key in each octave may be visually distinguished even from other primarily illuminated ones.

Figure 3D:
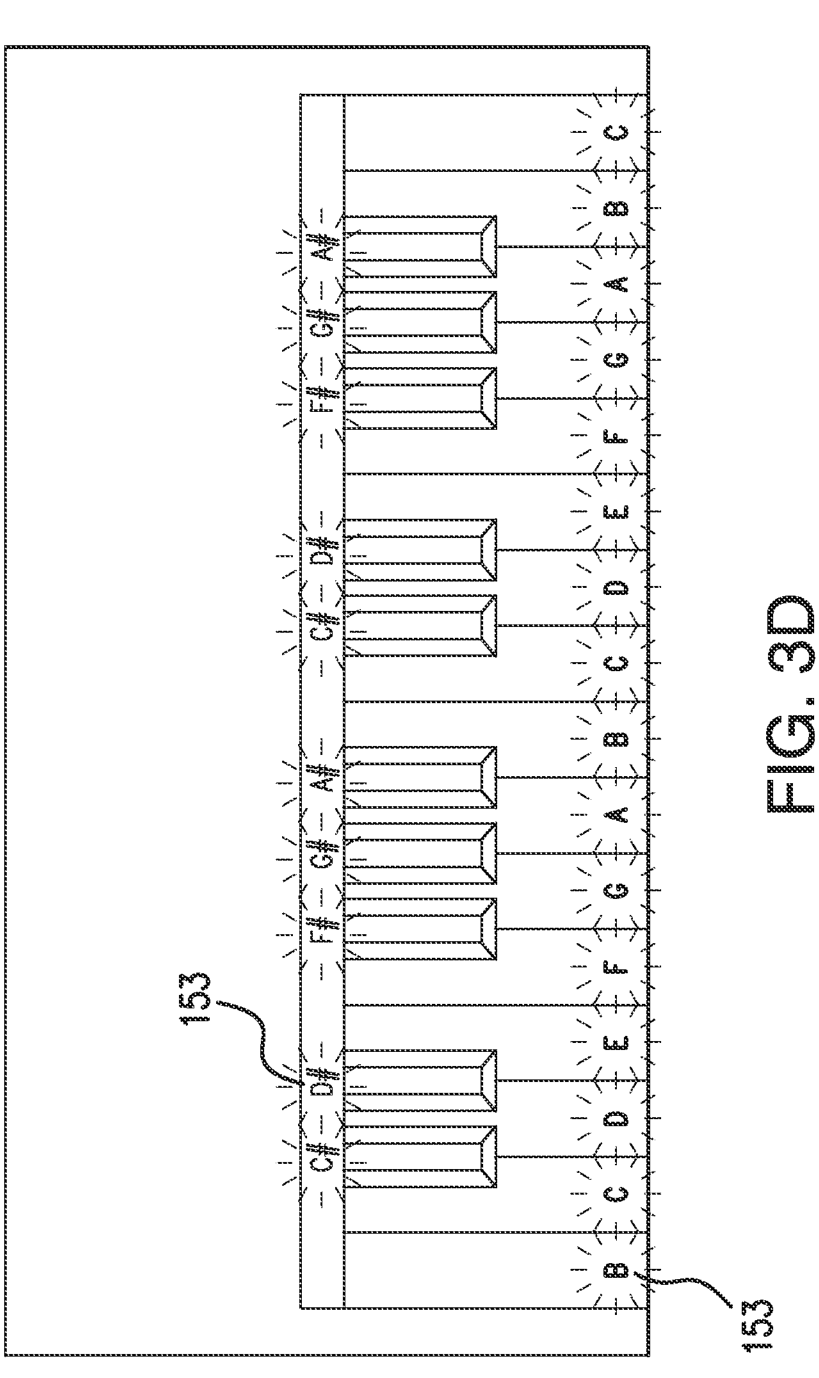
FIG. 3D is a simplified plan view, with certain details removed from view, of still another exemplary embodiment similar to the embodiment shown in FIG. 3, illustrating yet another alternate implementation of marker portions with respect to the keys, wherein the marker portions are combined with key note identifying indicia.

FIG. 3D illustrates an exemplary embodiment where the note references 153 for each of the keys serve as the lighting sources themselves. The note references may be formed by one or more LED or other such devices, graphically generated on a suitable display device, provided with backlighting, or otherwise established in any suitable manner. The color and/or intensity of their illumination or backlighting may be selectively controlled to visually highlight certain keys according to the acquired scale, constituency to an available chord, or the like.

In certain other embodiments and implementations, directed light in the form of multiple laser beams, for instance, may be employed to provide selective visual marking. The multiple beams may be concurrently directed to impinge upon and visually indicate the applicable scale's constituent keys.

While not shown, the marker portions 50 may be implemented in various other forms known in the art. Other forms include, for instance, electrochemically excited marker elements, electromagnetically excited marker elements, thermochromically excited marker elements, among others. In one example, a patch of liquid crystal elements may be disposed on, or in, each of the keys for selective excitation towards visual key indication. In another example, an electro-luminescent paint material may be applied to at least a portion of each key for selective excitation and visual key indication.

Figure 5A:
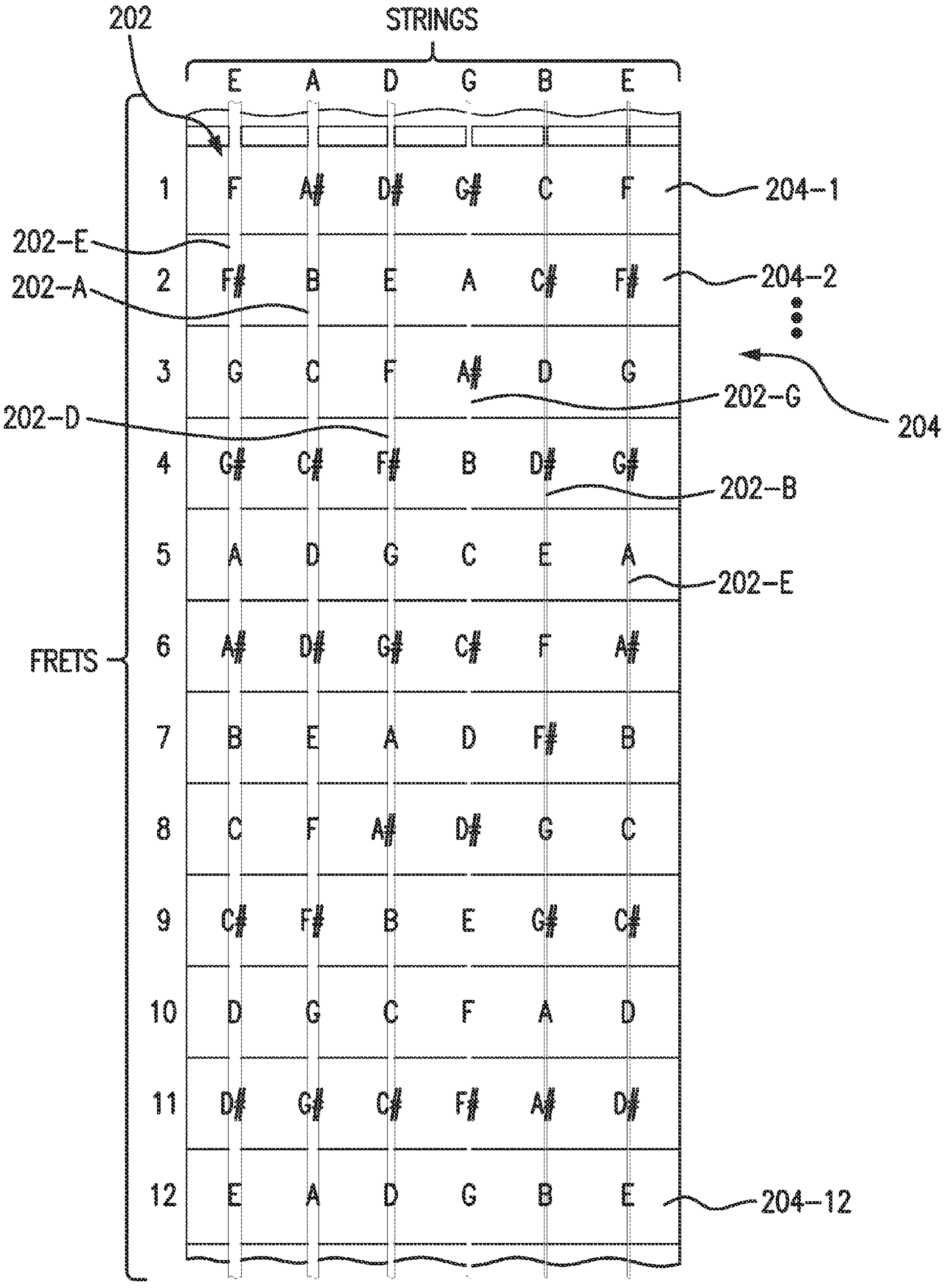
FIG. 5A is an illustrative diagram showing a plan view of a fingerboard, partially cut away, of a string controlled musical instrument, schematically illustrating a set of musical notes represented by various string and fret combinations; and, FIG. 5B is a plan view corresponding to the fingerboard portion, such as illustrated in FIG. 5A, in a musical instrument system incorporating the system embodiment of FIG. 1 in accordance with another exemplary implementation thereof, showing a sample implementation of marker portions with respect to various string-fret combinations.
Figure 5B:
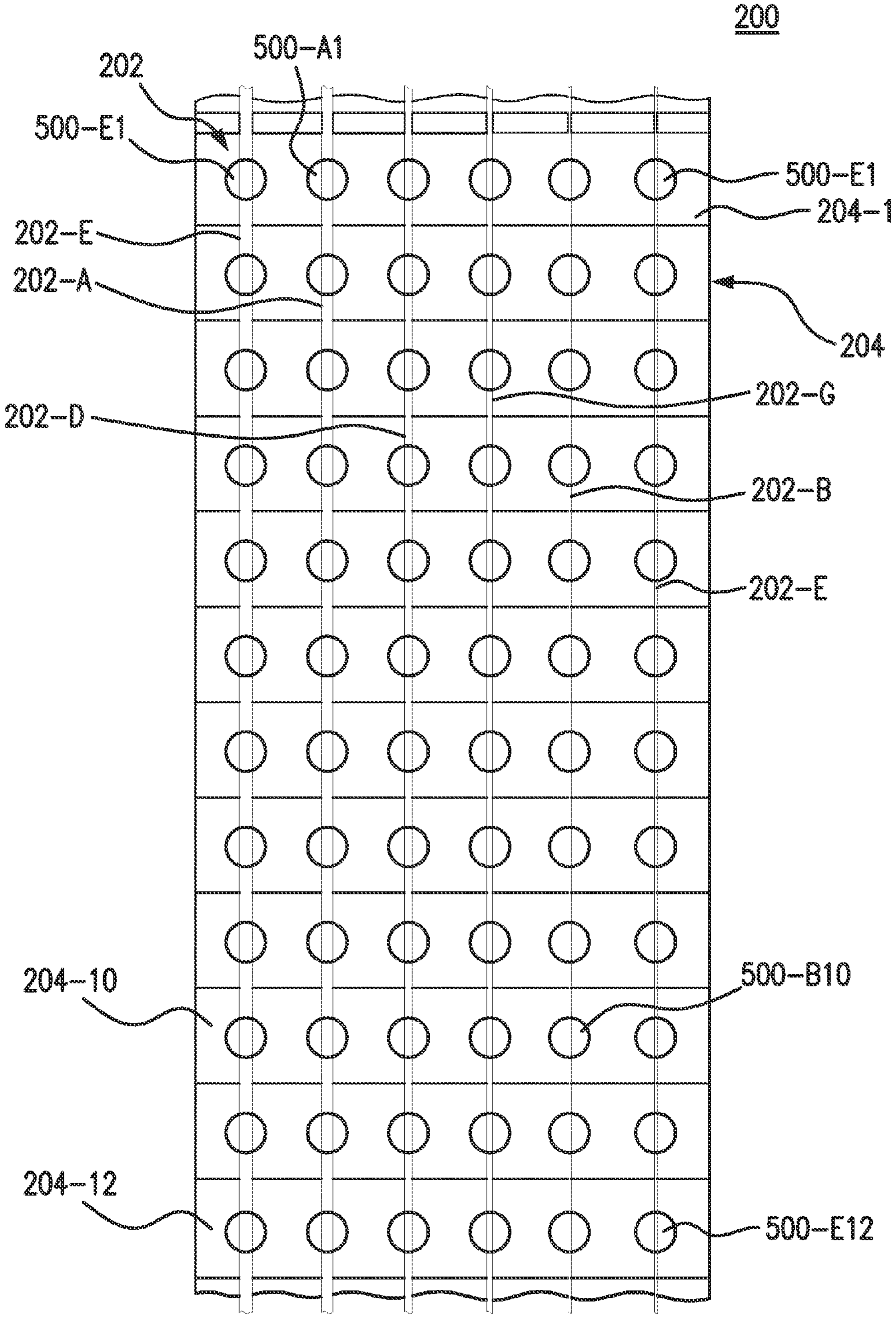

Turning to FIGS. 4A-4B, the scale delineation portion 40 operates to map the prevailing tone components of the acquired scale to the appropriate note actuators. The scale delineation portion 40 preferably accesses stored memory, namely the mode database 70 in the illustrated embodiment, for the requisite scale defining information. It accesses, for instance, a look up table such as illustrated in FIGS. 4B, 5B for the distinct tonal scale acquired, and effectively forms an electronic template which may be effectively 'overlaid' on the note actuators 20 of the given instrument to accurately identify those belonging to the acquired scale.

FIG. 4A schematically illustrates the case where "Major" is the acquired mode (also known as the Ionian mode). The table shows the possible key signature notes as row indices down the left-most reference column, and the note actuators spanning two octaves as column indices along the topmost reference row. To map the pattern of seven tone components characteristic of the Major mode, the scale delineation portion 40 operates to effectively form a mapping template 41 which identifies the note actuators within an octave that coincide with the ordered tone component positions of the Major mode. In both FIGS. 4A and 4B, the coinciding note actuators are indicated in the table by the symbol "O," while the other non-coinciding notes are indicted by the symbol "x." Since the key signature denotes the scale's root note, or the first tone component of the mode, the template 41 is shifted to align its first tone component position with the selected key signature note.

Thus, the note actuators coinciding with the tone components of the C-Major scale are identified by shifting the template 41 such that its first cell (leftmost cell in the illustrated example) aligns with the note actuator for the note C, as illustrated by the template instance 41-C. Similarly, the note actuators coinciding with the tone components of the D-Major scale are identified by shifting the template 41 such that its first cell aligns with the note actuator for the note D, as illustrated by the template instance 41-D. This template 41 may be so aligned with the other remaining key signatures to identify the coinciding note actuators for each resulting scale, such as illustrated by the template instances 41-C#, 41-D, all the way to the last two key signatures' template instances 41-A# and 41-B. In each instance of the template 41, the ordered pattern of whole and half step tone intervals for the Major mode is preserved.

FIG. 4B schematically illustrates the case where "Minor" is the acquired mode. As in FIG. 4A, the table shows the possible key signature notes as row indices down the left-most reference column, and the note actuators spanning two octaves as column indices along the topmost reference row. To map the pattern of seven tone components characteristic of the Minor mode, the scale delineation portion 40 operates to effectively form a mapping template 43 which identifies the note actuators within an octave that coincide with the ordered tone component positions of the Minor mode. Since the key signature denotes the scale's root tone component of the mode, the template 43 is again shifted to align its first tone component position with the key signature note selected.

Thus, the note actuators coinciding with the tone components of the C-Minor scale are identified by shifting the template 43 to align its first cell with the note actuator for the note C, as illustrated by the template instance 43-C. Similarly, the note actuators coinciding with the tone components of the D-Minor scale are identified by shifting the template 43 to align its first cell with the note actuator for the note D, as illustrated by the template instance 43-D. The template 43 may be so aligned with the other remaining key signatures to identify the coinciding note actuators for each resulting scale, such as illustrated by the template instances 43-C#, 43-D, all the way to the last of the key signatures' template instances 41-A# and 43-B. In each instance of the template 43, the ordered pattern of whole and half step tone intervals for the Minor mode is preserved.

Any tonal scale known in the art may be accommodated within the limits of the given musical instrument. Examples of key signatures and modes which may be selectively combined to define tonal scales of interest include (without limitation):

KEY SIGNATURE EXAMPLES (a) A
(b) A#/Bb
(c) B
(d) C
(e) C#/Db
(f) D
(g) D#/Eb
(h) E
(i) F
(j) F#/Gb
(k) G
(l) G#/Ab

MODE EXAMPLES (a) Major/Ionian*(a)-(h): Natural modes
(b) Dorian
(c) Phrygian
(d) Lydian
(e) Mixolydian
(f) Minor/Aeolian
(g) Locrian
(h) Pentatonic Minor
(i) Pentatonic Major
(j) Pentatonic Neutral
(k) Melodic Minor Descending
(l) Melodic Minor Ascending
(m) Harmonic Minor
(n) Half Diminished
(o) Whole Diminished
(p) Augmented
(q) Romanian Minor
(r) Spanish Gypsy
(s) Double Harmonic
(t) Eight Tone Spanish
(u) Enigmatic
(v) Enigmatic Minor
(w) Whole Tone
(x) Lydian Augmented (y) Neopolitan Major
(z) Neopolitan Minor
(aa) Pelog
(bb) Prometheus
(cc) Prometheus Neopolitan
(dd) Six Tone Symmetrical
(ee) Super Locrian
(ff) Lydian Minor
(gg) Lydian Diminished
(hh) Nine Tone
(ii) Auxiliary Diminished
(jj) Auxiliary Augmented
(kk) Auxiliary Diminished Blues
(ll) Major Locrian
(mm) Overtone
(nn) Diminished Whole Tone
(oo) Oriental
(pp) Hirajoshi
(qq) Hungarian Major
(rr) Hungarian Minor
(ss) Kumoi
(tt) Iwato
(uu) Hindu
(vv) Arabian
(ww) Gypsy
(xx) Mohammedan
(yy) Javanese
(zz) Persian
(aaa) Byzantine
(bbb) Hawaiian
(ccc) Mongolian
(ddd) Egyptian
(eee) Japanese
(fff) Chinese
(ggg) Composite II
(hhh) Dominant Suspended
(iii) Bebop Dominant
(jjj) Bebop Dorian
(kkk) Bebop
(lll) Chromatic Turning now to FIGS. 5A-5B, there is shown another exemplary implementation of system 10, in this case implemented in a guitar or other string controlled instrument system 200 by which notes and chords within certain tonal scales may be produced. The instrument system 200 includes an elongate fingerboard 204 (or fretboard) along which a plurality of parallel strings 202 are run. The fingerboard 204 is sectioned transverse frets into a series of fret gaps 204-1, . . . , 204-12 ("fret" and "fret gap" used synonymously herein for simplicity, in the 12-fret example shown). The individual strings 202-E, 202-A, 202-D, 202-G, 202-B, 202-E (one octave removed from the first string 202-E) are configured and tuned to certain notes when undisturbed, namely the notes E-A-D-G-B-E. When a user effectively shortens a string by holding it down at one of the frets 204-1, . . . , 204-12, the string's pitch when strum changes to a different note depending on the fret where held down. The distinct notes produced in this regard for different string and fret combinations are shown annotated in FIG. 5A, which illustrates a sample tuning configuration for the string-fret combinations. Different chords may be produced by holding down multiples strings 202 at different string-fret combinations.

Much as in the preceding implementation examples, therefore, the various tone components of acquired tonal scales may be visually marked on the strings and/or fingerboard of the instrument system 200. Mapping templates such as illustrated in FIGS. 4A-4B, in connection with a keyboard controlled musical instrument example, may be established in this regard, to map the available string-fret combinations of a given tuning configuration to distinct tonal scales (each characterized by distinct key signature and mode).

FIG. 5B shows the strings 202 and fingerboard 204, but with various annotations removed for clarity. In FIG. 5B, the marker portion 50 is shown implemented by an array of lighting elements 500 at respective string-fret locations. The individual lighting elements at different string-fret locations may be uniquely addressed within each octave according to their locations. For instance, the lighting element at the intersection of the first string 202-E and fret 204-1 may be addressed 500-E1, while the lighting element at the intersection of the string 202-B and the fret 204-10 may be addressed 200-B10. With appropriate accommodations made to distinguish addresses for multiple occurrences of the same note (one octave removed from one another) in the same fret, the lighting elements 500 may be selectively activated in this addressable manner, to visually mark those string-fret combinations belonging to acquired tonal scales. As in the preceding examples, the lighting elements may be modulated in color and/or intensity to distinguish additional levels/degrees of visual demarcation.

Where a musical instrument is reconfigured in tuning such that the alignment of its note actuators 20 with musical notes is altered, suitable adjustment processing is preferably carried out by either the marker controller 60 or the scale delineation portion 40 to properly adjust the mapping between the acquired tone components and note actuators 20. If a certain mapping template (such as illustrated in FIGS. 4A-4B) were originally employed to map the string-fret locations to a certain tonal scale, the note assignments for such note actuators (that is, each of the particular string at each particular fret) for that mapping template may be suitably adjusted to 'align' with the tuning scheme as reconfigured, and the appropriate marker portions excited accordingly.

String controlled musical instruments are particularly vulnerable to note realignment, as its strings repeatedly tuned, typically, each time it is played, by tightening or loosening along their lengths. While a standard tuning is illustrated in the guitar example of FIG. 5A, therefore, other variations in tuning, albeit not very common, may be used for instance by more advanced guitarists. The marker controller 60 and/or the scale delineation portion 40 would then execute appropriate adjustment processing to reassign activation of the lights in accordance with the altered note positioning due to the tuning change. The system thus adapts to manual re-tuning of the guitar strings, thereby helping guitarists to remain on key within the given tonal scale, and even helping less-advanced guitarists learn how to play the guitar with different tuning variations.

System 10 is preferably configured with, or subject to, one or more optional features, which may be incorporated within one or more portions of the system or as one of the selectively enabled functions 61, for ongoing or selective activation to suit the particular requirements and/or particular preferences of the user in a given application. These features, some of which are mentioned already in preceding paragraphs, include the following.

Chord Delineation

As mentioned an additional chord delineation operation is carried out in which the user is guided to quickly and easily navigate through the chords that are available within the selected key signature and mode; illuminating just 3 or 4 notes for instance to show how to play a selected cord. When the user selects a different key signature and mode; the available set of cords are adjusted to correspond with the new selection. The feature may be used simultaneously with tone component light indication, in which case the chord notes could light up in a different color or shade. The feature may be used in certain instances for standalone operation, in which case the tone component indication may be temporarily deactivated, so that just the chord only displaying the cord note values.

In certain embodiments employing a chord delineation function, the function when enabled is selectively toggled between alternative "Latch" and "Unlatch" configuration options. When the "Latch" option is toggled on, only the chords belonging to the selected tonal scale, or to the particular key signature/mode combination thereof, are made available for selection (and secondary illumination). When the "Unlatch" option is toggled on (that is, the "Latch" option is conversely toggled off), the complete set of chord options provided by database 70 may be drawn from as needed or desired, to make available for selection, regardless of the selected tonal scale. In that case, the keys/note actuators visually marked in connection with chord delineation (secondarily illuminated, for instance) may extend beyond the subset of keys/note actuators visually illuminated in connection with the selected tonal scale (primary illumination, for instance). A combined enable-latching selection switch device may be employed in other embodiments, which may be operated, for example, to scroll through On/Latch, On/Unlatch, and Off settings.

In music theory there are generally six types of chords: major, minor, dominant-7, diminished, augmented, and suspended. In addition, there are sub-variations to these chord types. For example, sub-variations of the so-called C minor chord include: C Minor 6th; C Minor 7th; C Minor 7th Flat Five, and the like. Depending on the key signature to which a mode is referenced, the chords and the different levels of available variation thereon which may be formed by the tone components of the same mode may be and often are different. That is, the type and number of chords which may be formed by a mode's tone component notes when referenced to a first key signature may be different from the type and number of chords which may be formed by the same mode's tone component notes when referenced to a second, different key signature. A Latch configuration keeps the secondary illumination of keys/note actuators to just those chords which may be formed within the selected tonal scale (defined by its characteristic key signature/mode combination), while an Unlatch configuration may extend the secondary illumination to a broader set of possible chords defined as needed/desired to suit a particular application and/or user preference. For example, the Unlatch configuration may be set to permit secondary illumination of all keys/note actuators contributing to chords which may be formed for the same mode, regardless of key signature.

Integrated/Retrofit Implementation

Depending on the particular embodiment and implementation intended, system 10 may be incorporated with the piano-type keyboards or other note actuator portions of musical instruments during the manufacturing process, making the system a permanent feature of that instrument. Additionally, suitable engineering measures known in the art may be employed to equip a given musical instrument with system 10 as a retrofit system. For example, the system may be installed with its marker portions temporarily disposed over the keys or other note actuators of the instrument, such that they may be interchangeably employed on different comparable instruments, such as piano keyboards with the same number of piano keys.

Key Finder

The scale acquisition portions 30 may in certain embodiments execute automatic acquisition of a tonal scale, using among other things a "key finder" option that utilizes a discrete internal microphone to detect the key signature and mode of any given piece of audio. If the key signature and mode are detectable (and discriminated with sufficient reliability), the detected key signature and mode are automatically selected; and, the names of the selected key signature and mode are displayed on an LCD screen provided on the musical instrument. The piano keys, or other note actuators, of the instrument are adaptively illuminated in view of the acquired scale, requiring no further action by the user in the key signature and mode selection process.

Note Deactivation

As mentioned, this option enables temporary deactivation of the piano keys/note actuators that are not part of the selected key signature and mode. While the keys/note actuators pertaining to the selected scale (which are illuminated or otherwise indicated) remain active to produce sound, send midi data messages, or other normal response when played by the user, the other keys/note actuators are rendered ineffectual temporarily, and unable to produce the responsive sound, midi messages, or the like when played.

Customization

A customization option may be implemented in system 10 to allow users to create, and also save various parametric presets. For example, certain signature key-mode combinations and specific chords within them may be predefined and catalogued in the database 70 for ready one-step selection via the user interface 32. The customized presets for various parameter settings may be created and deleted as desired. The preset may be assigned to certain designated selection 'buttons,' or auto-recall 'buttons' mechanically or virtually implemented by system 10. The user may save key signature and mode options to such designated buttons for quick selection of certain oft-used key signature and mode combinations, eliminating the need to navigate between every available key signature and mode option to make the desired selection.

Brightness Regulation

One or more brightness meters may be coupled to the marker controller 60 for automated regulation in certain embodiments employing lighting elements for at least some of the system's marker portions 50. The marker controller 60 is preferably configured in such embodiments to provide automatic gain control in driving the various LED's or other lighting elements, so as to regulate the level of brightness emitted by the LED bulbs. Alternatively, the brightness meter(s) may be used to selectively distinguish between different illumination levels for different, or even the same, lighting elements. In that way, added dimensions of visual demarcation may be realized, with requiring great numbers of distinct lighting elements.

Range Setting

As mentioned, a range setting may be used to designate precisely which octaves to activate for illumination, allowing the encompassed piano keys/note actuators anywhere from one octave to all octaves to remain available for illumination. The activated octaves may be consecutive or non-consecutive to each other, and may in certain cases include portions of an octave.

Full Activation

An "all on" option may be selected to illuminate every key/note actuator on the musical instrument. This option is made available in those embodiments where each of the piano keys/note actuators is already equipped with at least one LED device or other lighting element. It would provide a visually appealing display and prove useful for musicians and DJ's to accentuate performances in dark environments.

Controlled Marker Deactivation

Illuminated keys/note actuators may be deactivated in selectively set manner in certain embodiments and applications. An "all off" option preferably prompts all encompassed lighting elements to deactivate. Another deactivation option turns off the marker lighting elements, but allows the user control/input measures and LCD screens to function. Upon activating the lighting elements, the collection of keys/note actuators that illuminate will correspond to the notes belonging to the key signature and mode selected and displayed on the LCD screen.

Automatic Time-Out

An auto time-out feature implemented in the marker controller 60 for certain embodiments and applications may deactivate the lighting devices after a certain amount of time has elapsed. The user may selectively modify the time period and effective conditions (such as key inactivity) required for illuminated devices to deactivate. This is useful for plausible scenarios when a user forgets to turn off the device. Auto time-out helps in preserving lighting device life.

Adaptive Adjustment of Marker Portion Assignments

As mentioned, when system 10 is implemented in musical instruments that have different tuning options, an additional feature executed in certain embodiments automatically alters the positioning of the marker/lighting elements in accordance with the altered note positioning due to the tuning of the instrument.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A system for adaptive demarcation of a selectively defined tonal scale on a musical instrument, comprising:

a set of note actuators, each note actuator being independently excitable to actuate the musical instrument to generate a musical note corresponding thereto, said note actuators respectively corresponding to musical notes collectively spanning at least one musical octave;

a scale acquisition portion acquiring a tonal scale characterized at least by a predetermined mode and predetermined key signature, the predetermined key signature identifying one of the musical notes as a root tone component, the predetermined mode denoting a predefined ordered series of tone components beginning with the root tone component, the tone components respectively represented by different musical notes within one musical octave of the root component, the tone components being successively separated in pitch by tonal intervals;

a scale delineation portion coupled to said scale acquisition portion, said scale delineation portion adaptively mapping the tone components of the acquired tonal scale to a corresponding subset of said note actuators within at least one musical octave; and, a plurality of marker portions coupled respectively to said set of note actuators, said marker portions being selectively enabled according to the mapping of tone components to visually indicate said subset of note actuators corresponding thereto, wherein visual indication is adaptively maintained for said subset of note actuators pertaining to the acquired tonal scale;

wherein said scale acquisition portion is selectively configured for manual or automatic acquisition of the tonal scale, said scale acquisition portion in the automatic acquisition configuration executing on a music sample captured by acoustic sensing to derive a mode and key signature for the tonal scale based on the music sample, said scale acquisition portion in the manual acquisition configuration receiving the predetermined mode and key signature for the tonal scale set by through a user interface;

wherein said scale acquisition portion includes a configuration setting unit for selectively setting:

a key signature select parameter identifying the root tone component for the tonal scale;

a mode select parameter identifying the ordered series of tone components of the tonal scale with reference to the root tone component thereof;

a mode capture parameter for selecting the automatic acquisition configuration for acquiring the tonal scale;

a chord indication parameter for selectively enabling a chord indication unit executable to automatically identify each musical chord available for generation using the tone components within the acquired tonal scale, whereby said marker portions are selectively enabled responsive to user selection from the available musical chords for visually indicating corresponding ones of said subset of note actuators;

a range setting parameter for selectively disabling said marker portion of each of said note actuators disposed outside a selectively defined musical octave range; and, a note deactivation parameter for selectively disabling any of said note actuators for musical notes excluded from the tonal scale.

2. The system as recited in claim 1, further comprising a controller coupled to said scale delineation and marker portions, said controller automatically enabled a preselected set of said marker portions responsive to the mapping of tone components to selectively illuminate said subset of note actuators for at least one musical octave.

3. The system as recited in claim 1, wherein said chord indication unit is selectively operated to automatically identify each musical chord available for generation using the tone components within the acquired tonal scale, said marker portions being enabled responsive to user selection from the available musical chords for visually indicating corresponding ones of said subset of note actuators.

4. The system as recited in claim 3, wherein each of said marker portions includes at least one lighting element, and said lighting elements for said subset of note actuators are illuminated with different visual effect for:

a note actuator of the root tone component within said subset relative to note actuators of the other tone components within the same musical octave of the acquired tonal scale; and, note actuators of the tone components constituent to a selected musical chord relative to note actuators within the subset of the other tone components within the same musical octave of the acquired tonal scale.

5. The system as recited in claim 2, wherein said set of note actuators respectively actuate the musical instrument to generate musical notes collectively spanning a plurality of musical octaves; and, said controller operates a range setting unit to disable said marker portion for each of said note actuators corresponding to musical notes disposed outside a range of musical octaves selectively defined by user input.

6. The system as recited in claim 2, wherein said controller operates a note deactivation unit to disable any of said note actuators for musical notes excluded from the selectively defined tonal scale.

7. The system as recited in claim 1, wherein the set of note actuators includes a series of strings extending across a plurality of successive frets for a string controlled musical instrument, with different string and fret combinations defining the musical notes; and, said marker portions include a plurality of lighting element for independently illuminating different string and fret combinations.

8. The system as recited in claim 1, wherein the set of note actuators includes a series of keys for a keyboard controlled musical instrument, with consecutive keys in the series being offset by a tonal interval of one half step in pitch; and, said marker portions include at least one lighting element for independently illuminating each of said keys within said series of keys.

9. The system as recited in claim 8, wherein said scale delineation portion is executable to map the tonal scale to a subset of said keys, the tonal scale having:

a key signature selected from the group of musical notes consisting of: A, A#/Bb, B, C, C#/Db, D, D#/Eb, E, F, F#/Gb, G, and G#/Ab; and, a mode selected from the group consisting of: Major/Ionian, Dorian, Phrygian, Lydian, Mixolydian, Minor/Aeolian, Locrian, Pentatonic Minor, Pentatonic Major, Pentatonic Neutral, Melodic Minor Descending, Melodic Minor Ascending, Harmonic Minor, Half Diminished, Whole Diminished, Augmented, Romanian Minor, Spanish Gypsy, Double Harmonic, Eight Tone Spanish, Enigmatic, Enigmatic Minor, Whole Tone, Lydian Augmented, Neopolitan Major, Neopolitan Minor, Pelog, Prometheus, Prometheus Neopolitan, Six Tone Symmetrical, Super Locrian, Lydian Minor, Lydian Diminished, Nine Tone, Auxiliary Diminished, Auxiliary Augmented, Auxiliary Diminished Blues, Major Locrian, Overtone, Diminished Whole Tone, Oriental, Hirajoshi, Hungarian Major, Hungarian Minor, Kumoi, Iwato, Hindu, Arabian, Gypsy, Mohammedan, Javanese, Persian, Byzantine, Hawaiian, Mongolian, Egyptian, Japanese, Chinese, Composite II, Dominant Suspended, Bebop Dominant, Bebop Dorian, Bebop, and Chromatic.

10. A system for adaptive indication of note actuators for a musical instrument according to a selectively defined scale, comprising:

a set of note actuators, each note actuator being independently excitable to actuate the musical instrument to generate a musical note corresponding thereto, said note actuators respectively corresponding to musical notes collectively spanning a plurality of musical octaves;

a scale acquisition portion acquiring a tonal scale characterized at least by a predetermined mode and predetermined key signature, the predetermined key signature identifying one of the musical notes as a root tone component, the predetermined mode denoting a predefined ordered series of tone components beginning with the root tone component, the tone components respectively represented by different musical notes within one musical octave of the root component, the tone components being successively separated in pitch by tonal intervals;

a scale delineation portion coupled to said scale acquisition portion, said scale delineation portion adaptively mapping the tone components of the acquired tonal scale to a corresponding subset of said note actuators within at least one musical octave; and, a plurality of marker portions coupled respectively to said set of note actuators to be adaptively enabled responsive to acquisition of the tonal scale to visually indicate said subset of note actuators corresponding thereto, said marker portions including at least one lighting element for independently illuminating each of said note actuators within said subset of note actuators; and, a controller coupled to said scale delineation and marker portions, said controller executing to automatically enable a preselected set of said marker portions responsive to the mapping of tone components for at least one musical octave;

wherein said visual indication being thereby adaptively maintained for said note actuators pertaining to the tone components of the acquired tonal scale;

wherein said scale acquisition portion is selectively configured for manual or automatic acquisition of the tonal scale, said scale acquisition portion in the automatic acquisition configuration executing on a music sample captured by acoustic sensing to derive a mode and key signature for the tonal scale based on the music sample, said scale acquisition portion in the manual acquisition configuration receiving the predetermined mode and key signature for the tonal scale set through a user interface; and, said scale delineation portion includes a chord indication unit selectively operated to automatically identify each musical chord available for generation using the tone components within the acquired tonal scale, said marker portions being enabled responsive to user selection from the available musical chords for visually indicating corresponding ones of said subset of note actuators;

wherein the set of note actuators includes a series of keys for a keyboard controlled musical instrument, with consecutive keys in the series being offset by a tonal interval of one half step in pitch; and, said marker portions include at least one lighting element for independently illuminating each of said keys within said series of keys;

wherein said scale acquisition portion includes a configuration setting unit for selectively setting:

a key signature select parameter identifying the root tone component for the tonal scale;

a mode select parameter identifying the ordered series of tone components of the tonal scale with reference to the root tone component thereof;

a mode capture parameter for selecting the automatic acquisition configuration for acquiring the tonal scale;

a chord indication parameter for selectively enabling said chord indication unit;

a range setting parameter for selectively disabling said marker portion of each of said note actuators disposed outside a selectively defined musical octave range; and, a note deactivation parameter for selectively disabling any of said note actuators for musical notes excluded from the tonal scale.

11. The system as recited in claim 10, wherein said marker portions include at least one said lighting element disposed on each of said keys within said subset of note actuators.

12. The system as recited in claim 11, wherein said marker portions include a plurality of said lighting elements disposed on at least one of said keys within said subset of note actuators.

13. The system as recited in claim 10, wherein said scale delineation portion is executable to map the tonal scale to a subset of said keys, the tonal scale having:

a key signature selected from the group of musical notes consisting of: A, A#/Bb, B, C, C#/Db, D, D#/Eb, E, F, F#/Gb, G, and G#/Ab; and, a mode selected from the group consisting of: Major/Ionian, Dorian, Phrygian, Lydian, Mixolydian, Minor/Aeolian, Locrian, Pentatonic Minor, Pentatonic Major, Pentatonic Neutral, Melodic Minor Descending, Melodic Minor Ascending, Harmonic Minor, Half Diminished, Whole Diminished, Augmented, Romanian Minor, Spanish Gypsy, Double Harmonic, Eight Tone Spanish, Enigmatic, Enigmatic Minor, Whole Tone, Lydian Augmented, Neopolitan Major, Neopolitan Minor, Pelog, Prometheus, Prometheus Neopolitan, Six Tone Symmetrical, Super Locrian, Lydian Minor, Lydian Diminished, Nine Tone, Auxiliary Diminished, Auxiliary Augmented, Auxiliary Diminished Blues, Major Locrian, Overtone, Diminished Whole Tone, Oriental, Hirajoshi, Hungarian Major, Hungarian Minor, Kumoi, Iwato, Hindu, Arabian, Gypsy, Mohammedan, Javanese, Persian, Byzantine, Hawaiian, Mongolian, Egyptian, Japanese, Chinese, Composite II, Dominant Suspended, Bebop Dominant, Bebop Dorian, Bebop, and Chromatic.

14. A keyboard controlled musical instrument system having adaptive demarcation of a selectively defined tonal scale thereon, comprising:

a set of keys, each key being independently excitable to actuate the musical instrument to generate a musical note corresponding thereto, said keys respectively actuating the musical instrument to generate musical notes collectively spanning at least one musical octave;

a scale acquisition portion acquiring a tonal scale characterized at least by a predetermined mode and predetermined key signature, the predetermined key signature identifying one of the musical notes as a root tone component, the predetermined mode denoting a predefined ordered series of tone components beginning with the root tone component, the tone components respectively represented by different musical notes within one musical octave of the root component, the tone components being successively separated in pitch by tonal intervals;

a scale delineation portion coupled to said scale acquisition portion, said scale delineation portion adaptively mapping the tone components of the acquired tonal scale to a corresponding subset of said keys corresponding to musical notes within at least one musical octave; and, a plurality of marker portions coupled respectively to said set of keys, said marker portions being adaptively enabled responsive to the mapping of tone components to visually indicate said subset of the keys corresponding thereto; and, a controller coupled to said scale delineation and marker portions, said controller executing to automatically enable a preselected set of said marker portions responsive to the mapping of tone components for at least one musical octave;

wherein visual indication is adaptively maintained for each of said keys available for the tone components of the selectively defined tonal scale; and, wherein:

said marker portions include at least one lighting element for independently illuminating each of said keys within said subset of keys;

said scale acquisition portion is selectively configured for manual or automatic acquisition of the tonal scale, said scale acquisition portion in the automatic acquisition configuration executing on a music sample captured by acoustic sensing to derive a mode and key signature for the tonal scale based on the music sample, said scale acquisition portion in the manual acquisition configuration receiving the predetermined mode and key signature for the tonal scale set through a user interface;

said scale acquisition portion includes a configuration setting unit for selectively setting:

a key signature select parameter identifying the root tone component for the tonal scale;

a mode select parameter identifying the ordered series of tone components of the tonal scale with reference to the root tone component thereof;

a mode capture parameter for selecting the automatic acquisition configuration for acquiring the tonal scale;

a chord indication parameter for selectively enabling a chord indication unit executable to automatically identify each musical chord available for generation using the tone components within the acquired tonal scale, whereby said marker portions are selectively enabled responsive to user selection from the available musical chords for visually indicating corresponding ones of said subset of keys;

a range setting parameter for selectively disabling said marker portion of each of said keys disposed outside a selectively defined musical octave range; and, a note deactivation parameter for selectively disabling any of said keys for musical notes excluded from the tonal scale; and said scale delineation portion is executable to map the tonal scale to a subset of said keys, the tonal scale having:

a key signature selected from the group of musical notes consisting of: A, A#/Bb, B, C, C#/Db, D, D#/Eb, E, F, F#/Gb, G, and G#/Ab; and, a mode selected from the group consisting of: Major/Ionian, Dorian, Phrygian, Lydian, Mixolydian, Minor/Aeolian, Locrian, Pentatonic Minor, Pentatonic Major, Pentatonic Neutral, Melodic Minor Descending, Melodic Minor Ascending, Harmonic Minor, Half Diminished, Whole Diminished, Augmented, Romanian Minor, Spanish Gypsy, Double Harmonic, Eight Tone Spanish, Enigmatic, Enigmatic Minor, Whole Tone, Lydian Augmented, Neopolitan Major, Neopolitan Minor, Pelog, Prometheus, Prometheus Neopolitan, Six Tone Symmetrical, Super Locrian, Lydian Minor, Lydian Diminished, Nine Tone, Auxiliary Diminished, Auxiliary Augmented, Auxiliary Diminished Blues, Major Locrian, Overtone, Diminished Whole Tone, Oriental, Hirajoshi, Hungarian Major, Hungarian Minor, Kumoi, Iwato, Hindu, Arabian, Gypsy, Mohammedan, Javanese, Persian, Byzantine, Hawaiian, Mongolian, Egyptian, Japanese, Chinese, Composite II, Dominant Suspended, Bebop Dominant, Bebop Dorian, Bebop, and Chromatic.

15. The system as recited in claim 10, wherein said chord indication unit is selectively operated to automatically identify each musical chord available for generation using the tone components within the acquired tonal scale, said marker portions being enabled responsive to user selection from the available musical chords for visually indicating corresponding ones of said subset of note actuators.

16. The system as recited in claim 15, wherein each of said marker portions includes at least one lighting element, and said lighting elements for said subset of note actuators are illuminated with different visual effect for:

a note actuator of the root tone component within said subset relative to note actuators of the other tone components within the same musical octave of the acquired tonal scale; and, note actuators of the tone components constituent to a selected musical chord relative to note actuators within the subset of the other tone components within the same musical octave of the acquired tonal scale.

17. The system as recited in claim 10, wherein said controller operates a range setting unit to disable said marker portion for each of said note actuators corresponding to musical notes disposed outside a range of musical octaves selectively defined by user input.

18. The system as recited in claim 10, wherein said controller operates a note deactivation unit to disable any of said note actuators for musical notes excluded from the selectively defined tonal scale.

19. The system as recited in claim 14, wherein said chord indication unit is selectively operated to automatically identify each musical chord available for generation using the tone components within the acquired tonal scale, said marker portions being enabled responsive to user selection from the available musical chords for visually indicating corresponding ones of said subset of note actuators.

20. The system as recited in claim 19, wherein each of said marker portions includes at least one lighting element, and said lighting elements for said subset of note actuators are illuminated with different visual effect for:

a note actuator of the root tone component within said subset relative to note actuators of the other tone components within the same musical octave of the acquired tonal scale; and, note actuators of the tone components constituent to a selected musical chord relative to note actuators within the subset of the other tone components within the same musical octave of the acquired tonal scale.

* * * * *